Feb. 23, 1926.  
O. A. SCOGIN  
1,574,009  
COMBINATION LISTER, CULTIVATOR, AND RIDGE WORKER  
Filed March 22, 1923  2 Sheets-Sheet 1

INVENTOR.  
Orven. A. Scogin  
BY  
U. G. Charles  ATTORNEYS.

Patented Feb. 23, 1926.

1,574,009

UNITED STATES PATENT OFFICE.

ORVEN A. SCOGIN, OF WICHITA, KANSAS.

COMBINATION LISTER, CULTIVATOR, AND RIDGE WORKER.

Application filed March 22, 1923. Serial No. 626,350.

*To all whom it may concern:*

Be it known that I, ORVEN A. SCOGIN, a citizen of the United States, residing at Wichita, Sedgwick County, Kansas, have invented certain new and useful Improvements in a Combination Lister, Cultivator, and Ridge Worker, of which the following is a description, referring to the accompanying drawings, which form a part of this specification.

The invention relates to an agricultural implement of the type generally employed by farmers for listing and cultivating corn and the like; with such novel improvements in construction, adjustment and operation as will be clearly understood by reference to the accompanying drawings and the descriptive matter pertaining thereto.

Figure 1:
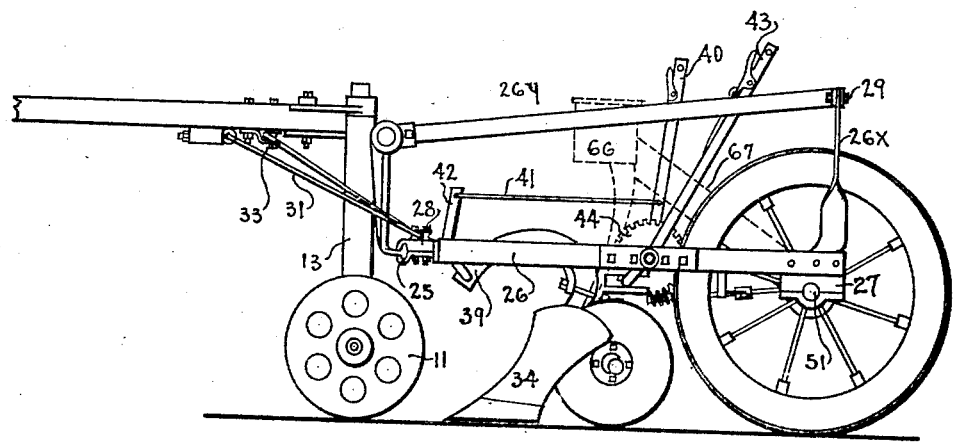
Figure 2:
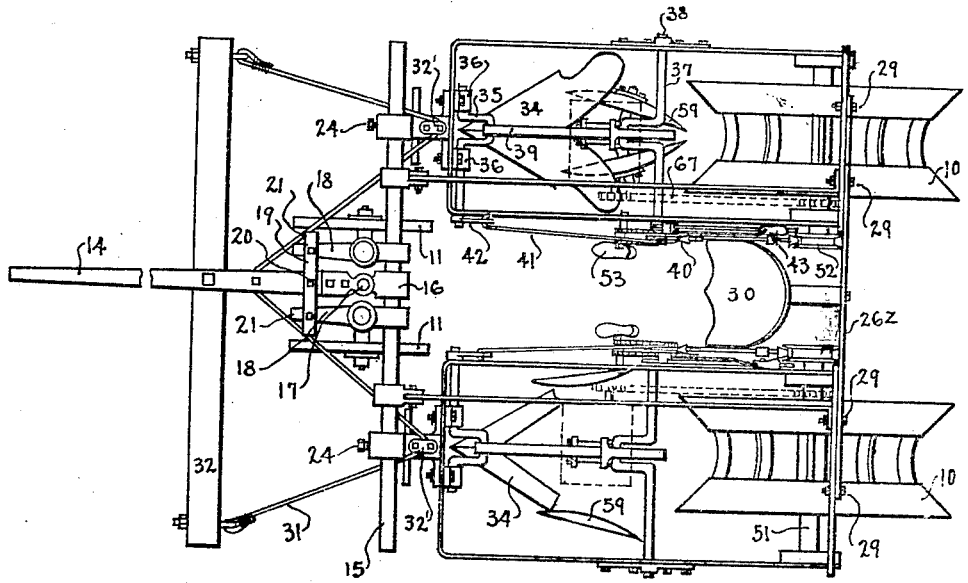
Figure 3:
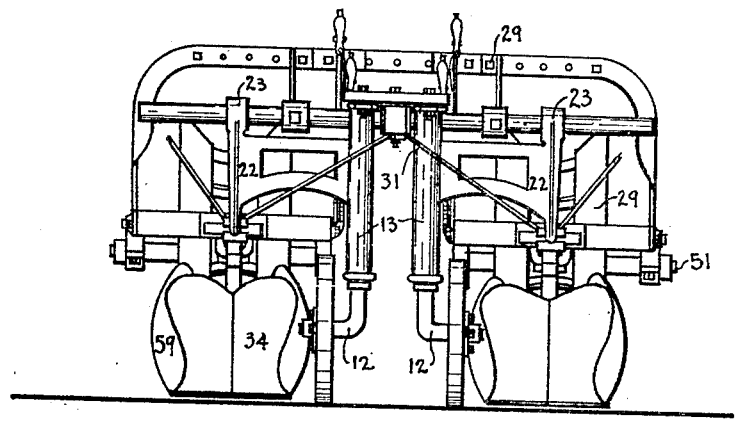

In the drawings; Fig. 1 shows a side elevation of the implement. Fig. 2 is a top view of Fig. 1. Fig. 3 is a front view of Fig. 1.

Similar numerals of reference indicate corresponding parts throughout all the figures of the drawings.

Referring to the drawings; the rear packing wheels 10, 10 and the forward wheels 11, 11 carry the implement. The wheels 11 rotate on the L-shaped shaft 12, 12. These shafts 12 are vertically arranged in vertical bearings 13, 13. The tongue 14 may be attached to a tractor or be horse drawn as desired. A forward transverse shaft is seen at 15 carrying a central connection 16 to which the tongue is pivoted at 17. It is desirable that the tongue movements control the line of travel of the wheels 11; for this purpose I employ arms 18, 18 rigid with the shafts 12, 12. A cross-arm 19 has a pivotable connection at 20 with the tongue 14 and at 21, 21 are similar pivotable connections between the arm 19 and the arms 18, it will be understood that these pivotal connections at 21 may be laterally moved for adjustment purposes of allied parts, later defined; thus as the tongue 14 is moved to the right or left, similar movements are transmitted to the wheels 11 which steers the implement as desired.

Outwardly extending from each bearing member 13 will be noted a web-like member 22, which are supported at 23, 23 from the shaft 15. By means of bolts 24, a suitable adjustment along the shaft may be had for purposes readily understood. The outer and lower end of the members 22 terminate in inwardly bent hook like elements 25. The main frame of the implement 26 is supported on the rear bearing supports 27 of the rear wheels 10, while the forward end of the frame 26 has a clamping element 28 adapted to adjustably anchor the element 25 and be supported thereby. Other elements of the frame 26 include the vertical supports $26^x$ and tie bars $26^y$. The bolts 29 may be adjustably changed to vary the width of the rear element $26^z$ of the frame to correspond with forward adjustments at 24. The driver's seat is disclosed at 30 supported from the framework.

In order to effect a proper pull on the implement proper and not occasion a torque or twist, I anchor a cable 31 to the transverse beam 32 carried by the tongue 14, this cable 31 leads around sheaves at 32', 32', 33.

It will be noted in Fig. 2 that the frame element 26 is in two parts rectangular in shape and within which the plow and disc elements are arranged, as disclosed as a pair. For convenience of illustration I have shown two types of plow elements, however it will be understood that in practice both plows would be the same in the implement and of the character best adapted for the work in hand. A plow 34 is raised or lowered within its framework 26 as follows. A forward crank shaft 35 is mounted in bearings 36, 36 on the frame 26. Similarly a rear crank shaft 37 is mounted in frame bearings 38. The forward beam support 39 engages the crank of the shaft 35. By means of a hand lever 40, link rod 41, lever 42 connected to the crank shaft 35 desired lifting or lowering movements may be given the toe of the plow 34. The lever 43 rigid with the shaft 37 operates to raise or lower the plow 34 supported from the crank element on shaft 37. The ratchet segment 44 operating to lock the parts in a desired position as readily understood.

For some purposes it is desired to throw the dirt back into the furrow, this is accomplished by the arrangement of the discs as shown in the upper half of Fig. 2; if the discs be arranged as in the lower half of Fig. 2 the dirt will be thrown away from the furrow.

It will be readily seen that a positive control of the plow mechanism is obtained by my invention, a flexibility of adjustment secured and a coaction of desired cultivating and discing elements functioning for the best purposes of the invention.

For listing, the box 66 carrying the seed may be situated as designated by the dotted position illustrated in Figs. 1 and 2. A chain shown dotted at 67 operatively leads from the shaft 51 to the box for the usual function.

Having fully described my invention what I now claim as new and desire to secure by Letters Patent is:—

In an agricultural implement, a frame structure including a plurality of frame elements; a transverse shaft forward of said frame elements; rear wheel elements supporting said frame structure; vertical bearings, each having a web-like element adjustably supported on the transverse shaft, forward wheel elements and shafts therefor, each shaft housed in one of said vertical bearings; a tie bar connecting between an upper portion of a web-like element and a rear portion of a frame element; and a hook element projecting from the base of a web-like element in engagement with a forward clamping device of an adjacent frame element, the rear ends of the frame elements being adjustable toward and from each other; and soil treating tools adjustably carried by each frame element.

ORVEN A. SCOGIN.